US009992467B2

(12) United States Patent
Lim et al.

(10) Patent No.: US 9,992,467 B2
(45) Date of Patent: Jun. 5, 2018

(54) PARALLEL COMPUTER VISION AND IMAGE SCALING ARCHITECTURE

(71) Applicant: Apple Inc., Cupertino, CA (US)

(72) Inventors: Suk Hwan Lim, Mountain View, CA (US); D. Amnon Silverstein, Palo Alto, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 15/198,907

(22) Filed: Jun. 30, 2016

(65) Prior Publication Data

US 2018/0007334 A1    Jan. 4, 2018

(51) Int. Cl.
| | |
|---|---|
| H04N 5/228 | (2006.01) |
| H04N 9/73 | (2006.01) |
| H04N 5/76 | (2006.01) |
| H04N 9/64 | (2006.01) |
| G06T 1/20 | (2006.01) |
| H04N 5/262 | (2006.01) |
| G06T 3/40 | (2006.01) |
| G06T 5/00 | (2006.01) |
| G06T 5/40 | (2006.01) |

(52) U.S. Cl.
CPC .............. *H04N 9/646* (2013.01); *G06T 1/20* (2013.01); *G06T 3/4015* (2013.01); *G06T 5/009* (2013.01); *G06T 5/40* (2013.01); *H04N 5/2628* (2013.01); *G06T 2207/10024* (2013.01); *G06T 2207/20072* (2013.01)

(58) Field of Classification Search
CPC ........ H04N 5/2628; H04N 9/646; G06T 1/20; G06T 3/4015; G06T 5/009; G06T 5/40; G06T 2207/10024; G06T 2207/20072
See application file for complete search history.

(56) References Cited

U.S. PATENT DOCUMENTS

| | | | |
|---|---|---|---|
| 8,340,411 B2 | 12/2012 | Fillion et al. | |
| 8,565,554 B2 | 10/2013 | Lu et al. | |
| 2006/0221226 A1* | 10/2006 | Yanof | H04N 5/3572 348/346 |
| 2008/0088857 A1* | 4/2008 | Zimmer | H04N 1/56 358/1.6 |

(Continued)

OTHER PUBLICATIONS

PCT International Search Report and Written Opinion for PCT/US2017/021646, dated May 18, 2017, 14 Pages.

(Continued)

*Primary Examiner* — Lin Ye
*Assistant Examiner* — John H Morehead, III
(74) *Attorney, Agent, or Firm* — Fenwick & West LLP

(57) ABSTRACT

Embodiments relate to an architecture of a vision pipe included in an image signal processor. The architecture includes a front-end portion that includes a pair of image signal pipelines that generate an updated luminance image data. A back-end portion of the vision pipe architecture receives the updated luminance images from the front-end portion and performs, in parallel, scaling and various computer vision operations on the updated luminance image data. The back-end portion may repeatedly perform this parallel operation of computer vision operations on successively scaled luminance images to generate a pyramid image.

20 Claims, 5 Drawing Sheets

(56) References Cited

U.S. PATENT DOCUMENTS

| | | | |
|---|---|---|---|
| 2009/0180707 A1* | 7/2009 | Li | G06T 5/004 382/266 |
| 2009/0316022 A1 | 12/2009 | Hatano | |
| 2010/0067742 A1* | 3/2010 | Ogawa | G06K 9/00369 382/103 |
| 2010/0110222 A1* | 5/2010 | Smith | H04N 1/32571 348/222.1 |
| 2011/0194769 A1* | 8/2011 | Jeong | G06K 9/00355 382/171 |
| 2012/0063639 A1* | 3/2012 | Yano | G06K 9/3233 382/103 |
| 2013/0148897 A1 | 6/2013 | Takacs et al. | |
| 2013/0216097 A1 | 8/2013 | Pau et al. | |
| 2013/0236126 A1* | 9/2013 | Kim | G06T 1/20 382/305 |
| 2013/0242199 A1* | 9/2013 | Hatano | H04N 9/045 348/659 |
| 2013/0258136 A1* | 10/2013 | Lee | H04N 5/772 348/231.99 |
| 2014/0192231 A1* | 7/2014 | Gunji | H04N 5/23235 348/231.99 |
| 2014/0270479 A1* | 9/2014 | Berestov | G06T 7/0085 382/154 |
| 2015/0139603 A1* | 5/2015 | Silverstein | H04N 5/23216 386/225 |
| 2017/0091575 A1* | 3/2017 | Lee | G06K 9/42 |

OTHER PUBLICATIONS

Dalal, N., et al., "Histograms of oriented gradients for human detection," Conference on Computer Vision and Pattern Recognition, Jun. 20-25, 2005, San Diego, CA, IEEE, Piscataway, NJ, USA, pp. 886-893, vol. 1.

Forsyth, D., "Local Image Features" In: "Computer Vision—A Modern Approach", Jan. 1, 2012, pp. 141-163.

Herpers, R., et al., "Edge and keypoint detection in facial regions", Automatic Face and Gesture Recognition, 1996., Proceedings of the Second International Conference on Killington, VT, USA, Oct. 14-16, 1996, Los Alamitos, CA, USA, IEEE Comput. Soc, US, pp. 212-217.

* cited by examiner

PARALLEL COMPUTER VISION AND IMAGE SCALING ARCHITECTURE

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages, or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Conventional image signal processing pipeline architectures equipped to process more complex image signal processing algorithms often sacrifice performance when processing more traditional image signal processing algorithms. Additional hardware components may be added to the architecture to increase performance but results in a larger device size. However, additional hardware components consume significant CPU bandwidth, increase power consumption, and increase device size.

SUMMARY

The embodiments relate to an architecture of a vision pipe included in an image signal processor where resizing operation and computer vision operations are performed in parallel. The architecture includes a front-end portion and a back-end portion. The front-end portion includes a pre-processor that generates a current luminance image and a resizer that generates an updated luminance image. The back-end portion receives the updated luminance image data from the front-end portion and performs, in parallel, scaling and various computer vision operations on the updated luminance image data. The back-end portion includes one or more computer vision processing paths that includes a resizer to further scale the updated luminance image and a computer vision component for performing computer vision operations in parallel with scaling performed by the resizer. The parallel operations of scaling and computer vision may be repeatedly performed on an updated scaled luminance image output by the resizer.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to vision pipe architecture for performing computer vision in parallel with image scaling. The vision pipe architecture may include a front-end circuit portion for performing pre-processing and a back-end circuit portion that includes a more computer vision circuit and a resizer circuit that operates in parallel on a current luminance image. The computer vision circuit may perform operations such as generation of histogram-of-oriented-gradients (HOG) data, convolution operation, and keypoint detection. By performing the resizing and computer vision operations in parallel, the image processing performance is enhanced.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
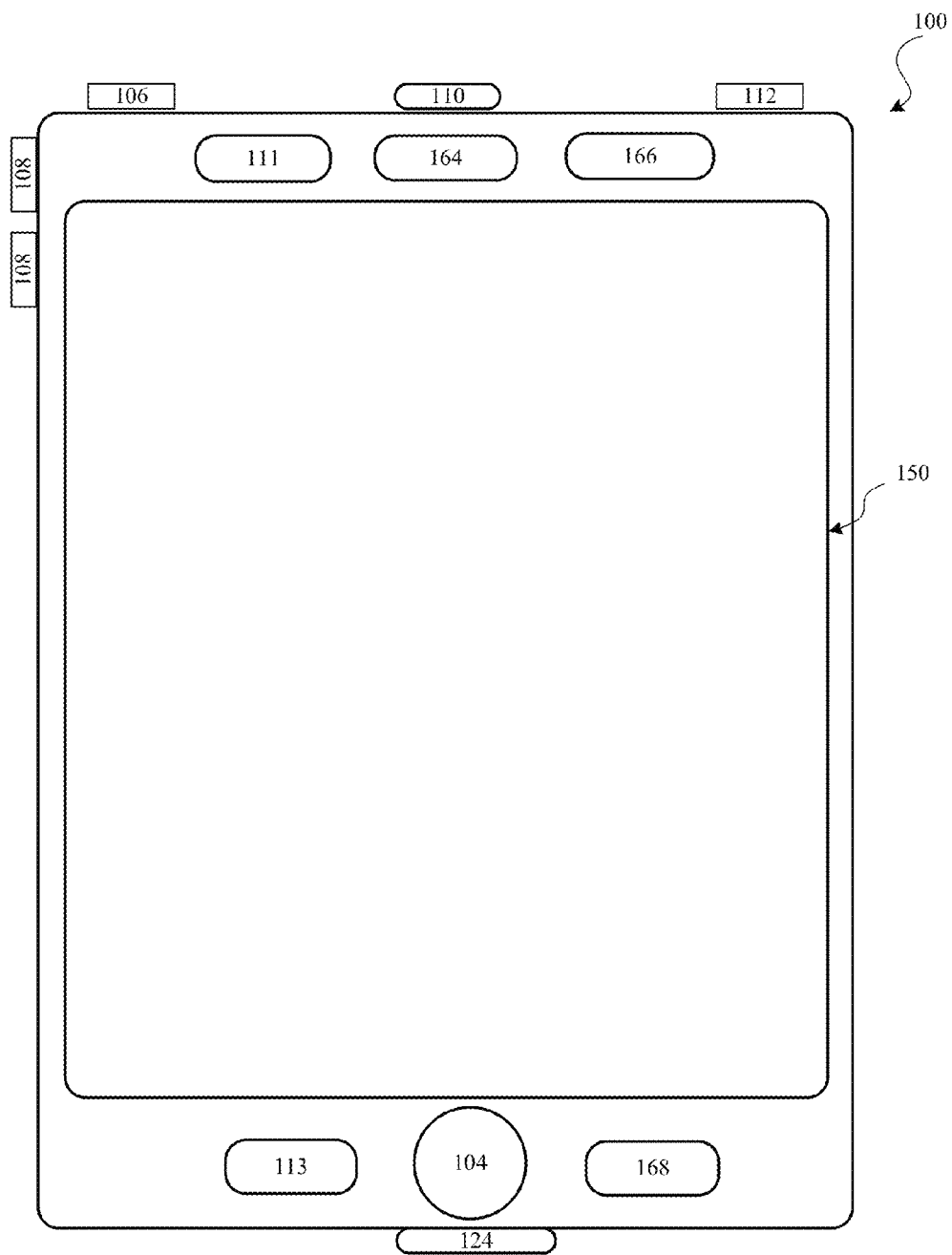
FIG. 1 is a high-level diagram of an electronic device, according to one embodiment.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
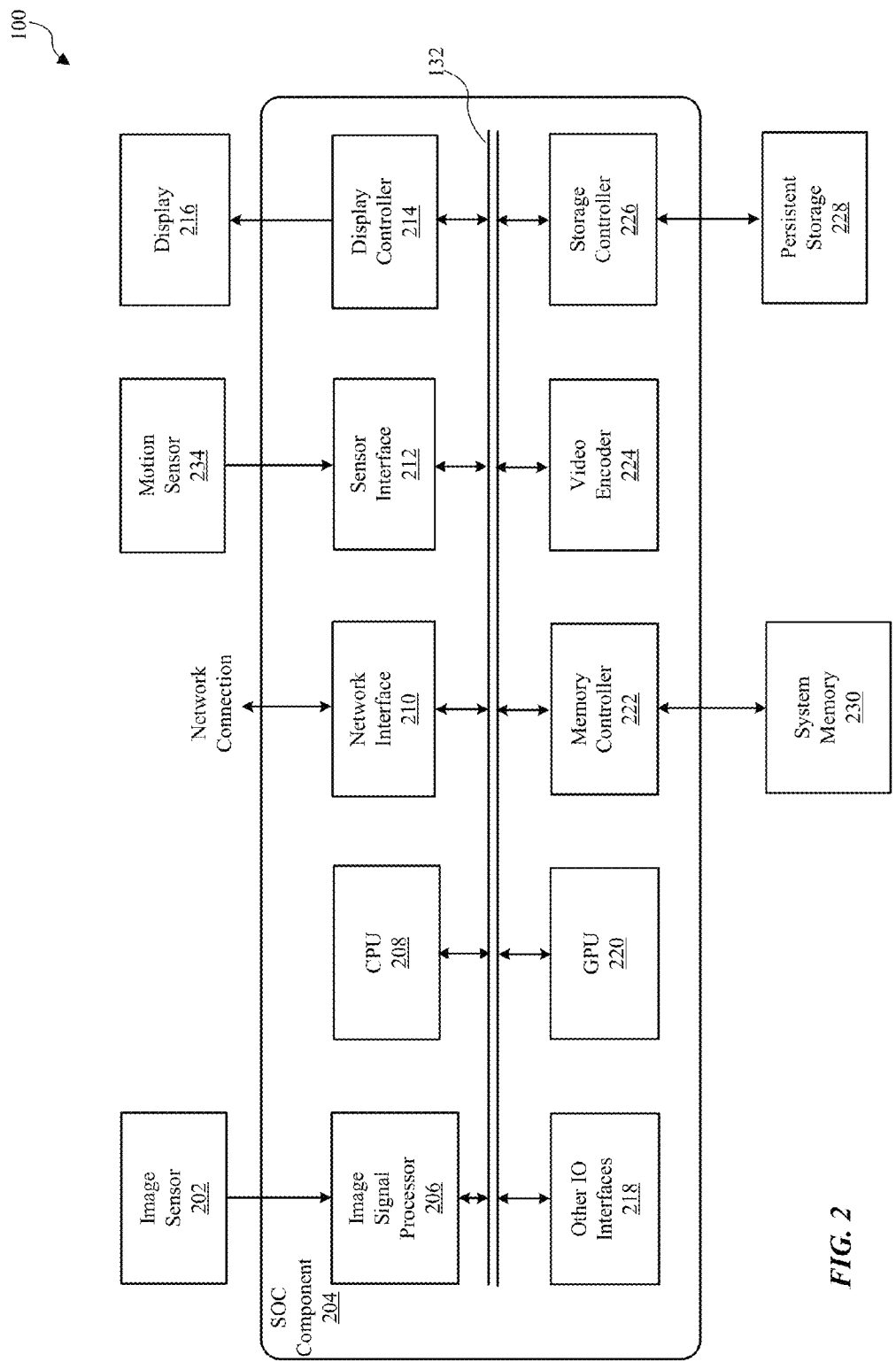
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228, or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to ISP 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor, or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220, or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208, or GPU 220. Such software components may be stored in system memory 230, persistent storage 228, or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
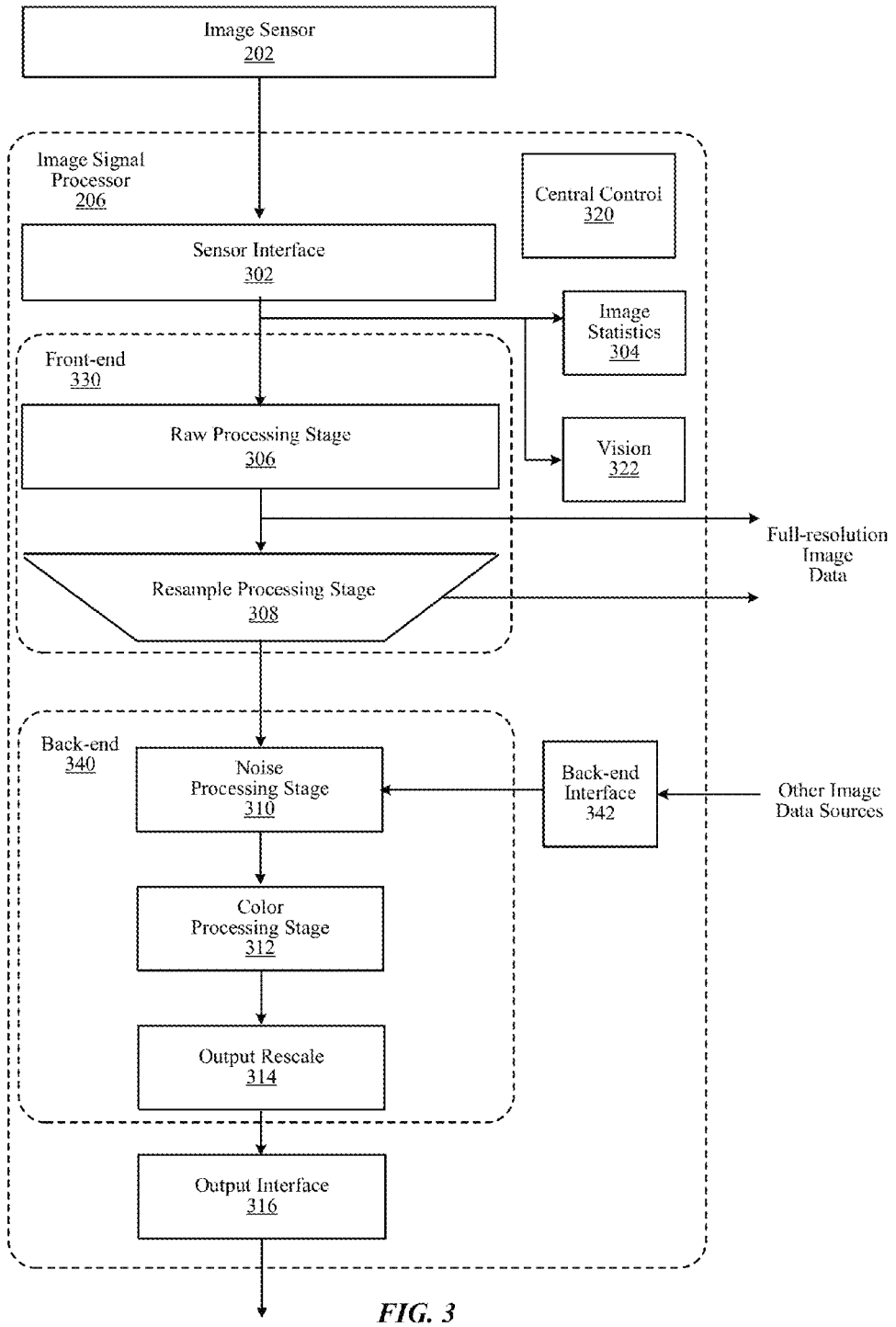
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture, or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as object detection in image data. The vision module 322 may perform various operations including pre-processing, global tone-mapping and Gamma correction, vision noise filtering, resizing, keypoint detection, convolution, and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. Convolution is a heavily used tool in image/video processing and machine vision. Convolution may be performed, for example, to generate edge maps of images or smoothen images. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. Further description of the vision module 322 is described in FIG. 4.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module 314 may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale module 314 may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Vision Module Architecture

Figure 4:
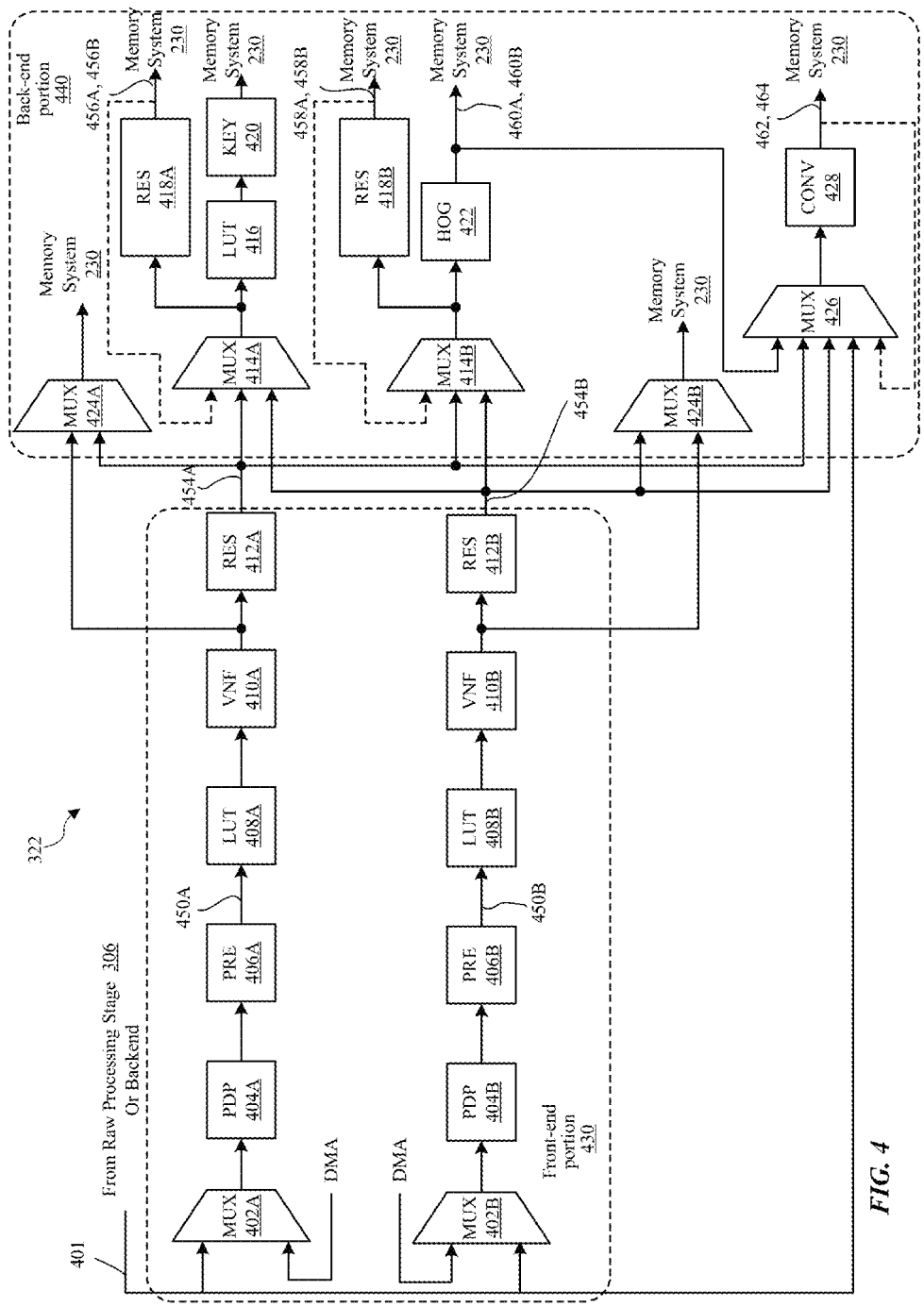
FIG. 4 is a block diagram illustrating a detailed view of the vision module of the image processing pipelines of FIG. 3, according to one embodiment.

FIG. 4 is a block diagram illustrating a detailed view of the vision module 322 of the image processing pipelines of FIG. 3, according to one embodiment. The vision module 322 enables computer vision and/or computer learning to be performed on one or more images independent of any additional image processing.

In one embodiment, the vision module 322 includes a front-end circuit portion 430 and a back-end circuit portion 440. The front-end circuit portion 430 may perform one or more operations such as pre-processing, global tone-mapping and Gamma correction, vision noise filtering, and resizing on image data 401 received from the raw processing stage 306, backend processing stage 340 or other parts of the SOC component 204. In the embodiment of FIG. 4, the front-end circuit portion 430 includes a pair of image signal pipelines where each image signal pipeline generates updated luminance images 454A, 454B by processing a portion of one or more received image data 401. The updated luminance images 454A, 454B generated by each of the image signal pipelines may be separately provided to the back-end circuit portion 440 to perform computer vision operations. Such architecture allows image scaling to be performed in parallel with different computer vision operations on the same image, different portions of the same image, or different images. Although only two pipelines are provided in front-end circuit portion 430 of the embodiment of FIG. 4, a single pipeline or more than two pipelines may be provided in a front-end circuit portion 430 depending on the processing speed and/or the size of the image data 401.

Each image signal pipeline in the front-end circuit portion 430 may include an interface circuit 402, pattern defect pixel (PDP) circuit 404, pre-processing (PRE) circuit 406, lookup table (LUT) 408, vision noise filter (VNF) 410, and resizer (RES) circuit 412. The interface circuit 402 is configured to receive image data 401 from a source (e.g., the persistent storage 228, the system memory 230, the image sensor, the raw processing stage 306, or the output of the back-end circuit portion 440) and forwards the image data 401 to a subsequent stage of the front-end circuit portion 430. The interface circuit 402 may be embodied as a multiplexer including a selection input (not shown) coupled to a control signal from the central control 320 to select the source of the image data 401.

PDP circuit 404 corrects patterned defect pixels (e.g., focus pixels) placed periodically throughout the image data 401. If the image data 401 does not include patterned defect pixels, the processing at the PDP circuit 404 may be bypassed or omitted. PDP circuit 404 also corrects defects that have known locations that can be read in from system memory 230 or persistent storage 228.

PRE circuit 406 converts image data of various pixel formats into luminance image data 450, as well known in the art. In one embodiment, the luminance image data 450 has a width that does not exceed a maximum width that corresponds to the width of the line buffer included in the VNF 410. When the image data received from PDP circuit 404 exceeds the maximum width of the line buffer included in the VNF 410, the PRE circuit 406 may perform binning to reduce the width of the luminance image data 450.

The LUT 408 transforms the luminance image data 450 into a non-linear space (e.g., gamma corrected) to modify the pixel values such that the pixel values follow similar tone curves of final rendered images, or can be used to move a non-linear image back to linear if desired.

The VNF circuit 410 improves the quality and performance of computer vision components included in the back-end circuit portion 440. The VNF circuit 410 receives the transformed luminance information from the LUT 408, and removes pixel defects and reduces noise in the image data. Pixel defects may include dot defects resulting from the long tail of the noise distribution that would not get filtered during the process of denoising. In one embodiment, the VNF circuit 410 employs one or more algorithms to perform dot detection and correction to fix any dots or defective pixels on a per-group of pixel basis. For example, one algorithm evaluates an image in groups of pixels arranged in an array, such as a 3×3 array. For each 3×3 array, the algorithm determines if the center pixel within the 3×3 array includes a dot or defect. To make the determination, the algorithm determines if: (1) the pixel intensity value of the center pixel minus a threshold value is greater than the maximum pixel intensity value of the neighboring pixels; and (2) the pixel intensity value of the center pixel plus the threshold value is less than the minimum pixel intensity value of the neighboring pixels. The threshold value may be determined by interpolating a 1-dimensional (1D) lookup table (LUT) with the look-up intensity. If the center pixel is identified as a dot or defective pixel, the VNF circuit 410 replaces the center pixel along the lowest gradient direction. Otherwise, the VNF circuit 410 passes the center pixel through.

The VNF circuit 410 may perform bilateral filtering to reduce noise by averaging neighbor pixels of similar brightness to the center pixel within the 3×3 array. For example, the VNF circuit 410 may perform a weighted average of pixel values that are geometrically and photometrically similar to the center pixel when the pixel difference between the center pixel and the neighboring pixels is not above a threshold. On the other hand, when the pixel difference between the center pixel and the neighboring pixel is above a threshold, such operation of computing weighted average of pixel values is not performed. The output of the VNF circuit 410 may be sent to a memory system 230 via multiplexer 424 or to RES circuit 412.

RES circuit 412 resizes or scales the luminance output received from the VNF circuit 410 to a specified scale ratio. RES circuit 412 separately performs resizing in the horizontal and vertical directions. The resized output generated by RES circuit 412 may be sent to the system memory 230 via multiplexer 424 or provided to computer vision components included in back-end circuit portion 440 for further processing. In one example, the further processing at the back-end circuit portion 440 includes generating an image pyramid by using additional resizer located in the back-end circuit portion 440 to repeatedly resize the luminance image with varying scale ratios where the output of the RES circuit 412 serves as the first level resolution luminance image corresponding to a base of an image pyramid.

The back-end circuit portion 440 includes components that perform various computer vision algorithms on the scaled luminance image output by the image signal pipelines included in the front-end circuit portion 430. Example computer vision algorithms performed at the back-end circuit portion 440 may include, among others, keypoint detection, histogram-of-oriented-gradients (HOG) data generation, and convolution. Separate computer vision processing paths corresponding to each of the various computer vision algorithms may receive the output of each pipeline of the pair of image signal pipelines to perform multiple computer vision operations in parallel.

A keypoint detection processing path performs keypoint detection on an updated luminance image 454A output by RES circuit 412A or an updated luminance image 454B output by RES circuit 412B, or an updated scaled luminance image generated by RES circuit 418A retrieved from the memory system 230. The keypoint detection processing path includes multiplexer (MUX) 414A, LUT 416, keypoint (KEY) 420, and RES circuit 418A. MUX 414A includes a first input coupled to receive the output of RES circuit 412A in the first image signal pipeline, a second input coupled to receive the output of RES circuit 412B in the second image signal pipeline, and a third input coupled to the memory system 230 to read data. MUX 414A selects inputs to feed downstream for further processing of keypoint detection and resizing.

The output of MUX 414A is fed to LUT 416 to, for example, perform an operation similar to an operation performed at LUT 408 except that LUT 416 may also perform bit conversion (e.g., 12 bit to 8 bit conversion). KEY 420 receives the output of LUT 416 and identifies objects of interest, referred to as keypoints, in the received image. In one or more embodiments, LUT 416 may be omitted. Generally, keypoints refer to locations within an image that are surrounded with image patches well suited to matching in other images of the same scene or object. KEY 420 receives an updated luminance image 454A output by RES circuit 412A at a first time period. During the first time period, KEY 420 may perform keypoint detection on the updated luminance image 454A. RES circuit 418A operates in the same manner as RES circuit 412 and generates an updated scaled luminance image from the output of RES circuit 412A or 412B.

A scaled luminance image 456A generated by RES circuit 418A in the first time period is saved in the memory system 230 and then sent back to MUX 414A in a subsequent second time period as an updated scaled luminance image (as shown by dashed line in FIG. 4) for subsequent processing at RES circuit 418A and KEY 420 as well as resizing operation at RES circuit 418A. RES circuit 418A scales the updated scaled luminance image, while KEY 420 performs keypoint detection on the updated scaled luminance image in parallel. In the second time period, a scaled luminance image 456B is generated by RES circuit 418B, saved in the memory system 230 and then sent back to MUX 414A in a subsequent third time period. This process may be repeated by RES circuit 418A and KEY 420 to perform keypoint detection on successively scaled luminance images of an image pyramid, as produced by RES circuit 418A.

In one embodiment, KEY 420 may perform sub-sampling of the 8-bit luminance image to reduce the size of the input image. For example, KEY 420 may sub-sample every 1, 2, 4, or 8 pixels, both horizontally and vertically. The type of sub-sampling may be set using a programmable register. KEY 420 may also operate in various modes depending on the type or characteristic of the keypoint of interest. The various operating modes include a first or standard mode for 2D matching, a second mode for identifying vertical edges, and a third mode for identifying horizontal edges. KEY 420 employs a multi-step algorithm to detect a keypoint when operating in one of the various modes. KEY 420 employs one or more algorithms well known in the art to identify keypoints depending on the operating mode of KEY 420. The output of KEY 420 may be coupled to write to the memory system 230 for further processing by the ISP 206.

A HOG processing path computes HOG data or a pyramid image at each successively scaled luminance image. The HOG processing path includes MUX 414B, RES circuit 418B, and HOG 422. Like MUX 414A, MUX 414B includes three inputs, each coupled to RES circuit 412A, RES circuit 412B or the memory system 230, and selects inputs to be sent downstream to HOG 422 and RES circuit 418B. To compute HOG data 460A, 460B for a pyramid image, the output of RES circuit 418B is coupled to the memory system 230, which may be accessible by MUX 414B. A scaled luminance image 458A is generated as output of RES circuit 418B in the first time frame based on the updated luminance image 454, and an updated scaled luminance image 458B is generated as output of RES circuit 418B based on the scaled luminance image 458A in the subsequent second time frame. MUX 414B may retrieve the luminance image output by RES circuit 418B in a previous time period (as shown by a dashed line) and output the luminance image to RES circuit 418B and HOG 422. RES circuit 418B scales the updated scaled luminance image while HOG 422 computes HOG data of the updated scaled luminance image in parallel. HOG 422 writes its output to the memory system 230, which may be further processed by other computer vision components included in the back-end circuit portion 440. This process may be repeated by RES circuit 418B and HOG 422 to perform HOG feature detection on successively scaled luminance images of an image pyramid.

A convolution (CONV) processing path includes components that perform convolution algorithms on an updated luminance image from the front-end circuit portion 430, HOG data 460A, 460B from HOG 422, and image data output from the CONV processing path. The CONV processing path includes MUX 426 and CONV 428. CONV circuit 428 performs a convolution operation using algorithms well known in the art. MUX 426 includes a first input coupled to the output of RES circuit 412A, a second input coupled to the output of RES circuit 412B, a third input coupled to the output of HOG 422, and a fourth input coupled to the memory system 230 to receive the output of CONV 428 obtained in a previous time period (as shown by a dashed line). MUX 426 selects inputs to be sent to CONV 428, which in turn performs a convolution operation on the input image data received from MUX 426.

CONV 428 may perform convolution operation in parallel with other computer vision components, such as KEY 420 and HOG 422. In one embodiment, CONV 428 performs a convolution operation on the first HOG data 460A during the first time period to generate a first result 462. During the subsequent second time period CONV 428 performs the convolution operation on HOG data 460B to generate a second result 464.

The operations performed in the back-end circuit portion 440 are merely illustrative. The back-end circuit portion 440 may include circuits to perform only a subset of keypoint detection, HOG, and convolution operations. Alternatively, the back-end circuit portion 440 may include further circuits to perform additional computer vision operations such as additional descriptors generation, face detection, etc.

Example Process of Performing Computer Vision Operations

Figure 5:
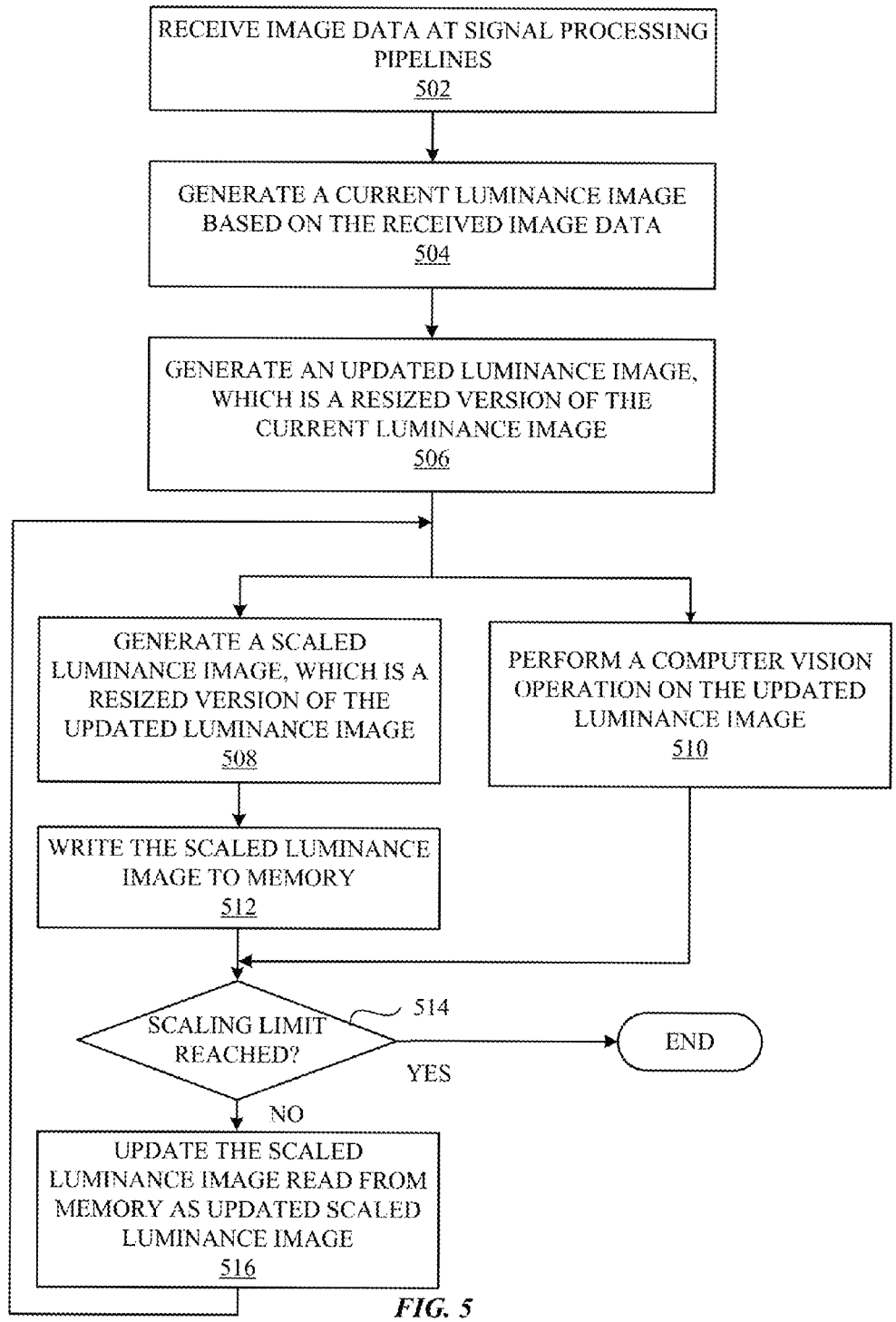
FIG. 5 illustrates a flowchart for performing a computer vision operation in parallel with an image scaling operation, according to one embodiment.

FIG. 5 illustrates a flowchart for performing a computer vision operation in parallel with image scaling, according to one embodiment. Note that in other embodiments, steps other than those shown in FIG. 5 may be performed.

In one embodiment, the front-end circuit portion 430 receives 502 image data via an interface circuit 402. The received image data may include different portions of the same image or different images. A pre-processor 406 included in the front-end circuit portion 430 generates 504 current luminance image from the received image data. RES circuit 412 generates 506 an updated luminance image based on the first luminance image. The updated luminance image is a resized version of the current luminance image.

The back-end circuit portion 440 may generate successively scaled luminance images forming an image pyramid while, in parallel, performing computer vision operations on each scaled image. For example, back-end circuit portion 440 includes RES circuit 418 that generates 508, during a first time period, a scaled luminance image, which is a resized version of the updated luminance image output by the front-end circuit portion 430. RES circuit 418 writes 512 the scaled luminance image to the memory system for further processing.

During the first time period, the back-end circuit portion 440 also performs 510 a computer vision operation of the updated luminance image. Different computer vision components included in the back-end circuit portion 440 may perform different computer vision operations on each scaled luminance image in parallel. For example, KEY 420 may perform keypoint detection of the updated luminance image while HOG 422 performs HOG operations on the same updated luminance image, or different updated luminance image of a different received image or different portion of the same received image. In another example, one or a combination of KEY 420, HOG 422, and CONV 428 may operate in parallel during the first time period to perform their respective computer vision operations on updated luminance data output by one or a combination of image signal processing pipelines corresponding to the output of RES circuit 412A and RES circuit 412B.

The back-end circuit portion 440 then determines 514 whether the scaled luminance image exceeds a scaling limit. In one example, the scaling limit of the scaled luminance image is 32 pixels-wide. If the scaling limit is not reached, the updated scaled luminance image is retrieved 516 from the memory system as an updated scaled luminance image, which may be re-scaled during a second time period by RES circuit 418 and operated by computer vision components in accordance with steps 508, 510, and 512. The back-end circuit portion 440 repeats the loop formed by steps 508, 510, and 512 until a determination 514 is made that the scaling limit is reached. If it is determined 514 that the scaling limit is reached, the process terminates.

The language used in the specification has been principally selected for readability and instructional purposes, and it may not have been selected to delineate or circumscribe the inventive subject matter. It is therefore intended that the scope of the disclosure of the embodiments of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An image signal processor comprising:
    an interface circuit configured to receive an image;
    a front-end circuit portion configured to:
        receive the image via the interface circuit and generate a current luminance image based on the received image, and
        generate an updated luminance image, which is a resized version of the current luminance image; and
    a back-end circuit portion coupled to an output of the front-end circuit, the back-end circuit comprising a resizer circuit and a computer vision circuit configured to perform resizing operations and computer vision operations in parallel, wherein:
        the resizer circuit is configured to generate a scaled luminance image which is a resized version of the updated luminance image during a first time period, the resizer circuit further configured to generate an updated scaled luminance image by resizing the scaled luminance image during a second time period subsequent to the first time period, and
        the computer vision circuit is configured to perform a computer vision operation on the updated luminance image during the first time period and perform the computer vision operation on the scaled luminance image during the second time period.

2. The image signal processor of claim 1, wherein the resizer circuit is further configured to resize the updated scaled luminance image during a third time period subsequent to the second time period.

3. The image signal processor of claim 2, the computer vision circuit is configured to perform the computer vision operation on the updated scaled luminance image during the third time period.

4. The image signal processor of claim 1, wherein the computer vision circuit comprises a histogram-of-oriented-gradients (HOG) circuit coupled to the resizer circuit, the HOG circuit configured to:
    generate first HOG data of the updated luminance image during the first time period, and
    generate second HOG data of the scaled luminance image during the second time period.

5. The image signal processor of claim 4, wherein the computer vision circuit further comprises a convolution circuit coupled to the HOG circuit, the convolution circuit configured to perform a convolution operation on the first HOG data during the first time period, and perform the convolution operation on the second HOG data during the second time period.

6. The image signal processor of claim 1, wherein the computer vision circuit further comprises a convolution circuit coupled to the output of the front end circuit, the convolution circuit configured to receive the updated luminance image and perform a convolution operation on the updated luminance image data during the first time period.

7. The image signal processor of claim 1, wherein the computer vision circuit further comprises a keypoint detection circuit coupled to:
    detect one or more image locations within the updated luminance image during the first time period, the detected one or more image locations within the updated luminance image including candidate locations for matching locations in another image; and
    detect one or more image locations within the scaled luminance image during the second time period, the detected one or more image locations within the scaled luminance image including candidate locations for matching locations in the other image.

8. The image signal processor of claim 1, wherein the front-end circuit portion comprises a pair of image signal pipelines to generate the updated luminance image, each of the image signal pipelines configured to process a portion of the received image to generate a portion of the updated luminance image.

9. The image signal processor of claim 8, wherein each of the image signal pipelines further comprises a pre-processor configured to convert image data from the interface circuit into color corrected luminance data.

10. The image signal processor of claim 8, wherein each of the image signal pipelines comprise a resizer component to reduce a size of the portion of the current luminance image.

11. The image signal processor of claim 10, wherein each of the image signal pipelines further comprises a look-up table configured to generate a raw luminance image of the portion of the current luminance image.

12. The image signal processor of claim 11, wherein each of the image signal pipelines further comprises a bilateral filter between the look-up table and the resizer component to filter noise in the raw luminance image.

13. The image signal processor of claim 1, wherein the interface circuit is coupled to a sensor or a raw processing stage of the image signal processor.

14. The image signal processor of claim 13, wherein the interface circuit is a multiplexer.

15. The image signal processor of claim 14, wherein the multiplexer is configured to receive the scaled luminance image after the first time period and the updated scaled luminance image after the second time period.

16. A method comprising:
receiving an image at a front-end circuit portion of an image signal processor via an interface circuit;
generating a current luminance image corresponding to the received image;
generating an updated luminance image by resizing the current luminance image;
generating a scaled luminance image which is a resized version of the updated luminance image during a first time period;
performing a computer vision operation on the updated luminance image in parallel with generating of the scaled luminance image during the first time period;
generating an updated scaled luminance image which is a resized version of the scaled luminance image during a second time period subsequent to the first time period; and
performing the computer vision operation on the scaled luminance image in parallel with generating of the updated scaled luminance image during the second time period.

17. The method of claim 16, further comprising:
generating first histogram-of-oriented gradients (HOG) data of the updated luminance image during the first time period; and
generating second HOG data of the scaled luminance image during the second time period.

18. The method of claim 17, further comprising:
performing a convolution operation on the first HOG data during the first time period; and
performing the convolution operation on the second HOG data during the second time period.

19. The method of claim 16, wherein performing the computer vision operation further comprises:
detecting one or more image locations within the updated luminance image during the first time period, the detected one or more image locations within the updated luminance image including candidate locations for matching locations in another image; and
detecting one or more image locations within the scaled luminance image during the second time period, the detected one or more image locations within the scaled luminance image including candidate locations for matching locations in the other image.

20. An electronic device comprising:
an image sensor;
an interface circuit configured to receive an image from the image sensor;
a front-end circuit portion configured to:
 receive the image via the interface circuit and generate a current luminance image based on the received image, and
 generate an updated luminance image, which is a resized version of the current luminance image; and
a back-end circuit portion coupled to an output of the front-end circuit, the back-end circuit comprising a resizer circuit and a computer vision circuit configured to perform resizing operations and computer vision operations in parallel, wherein:
 the resizer circuit is configured to generate a scaled luminance image which is a resized version of the updated luminance image during a first time period, the resizer circuit further configured to generate an updated scaled luminance image by resizing the scaled luminance image during a second time period subsequent to the first time period, and
 the computer vision circuit is configured to perform a computer vision operation on the updated luminance image during the first time period and perform the computer vision operation on the scaled luminance image during the second time period.

* * * * *